United States Patent Office.

EDWARD S. RITCHIE, OF BROOKLINE, MASSACHUSETTS.

*Letters Patent No. 77,763, dated May 12, 1868.*

IMPROVED PAINT FOR LIQUID COMPASSES, &c.

The Schedule referred to in these Letters Patent and making part of the same.

TO ALL PERSONS TO WHOM THESE PRESENTS SHALL COME:

Be it known that I, EDWARD S. RITCHIE, of Brookline, in the county of Norfolk, and State of Massachusetts, have made a new and useful Invention having reference to Paint which is to be exposed to the action of alcohol, or an alcoholic mixture, when used in what is termed a "Liquid Compass;" and I do hereby declare the nature of my invention, and the manner in which it is to be compounded, to be described as follows:

Common paint, when applied to the cards of liquid compasses, employed on shipboard for indicating the magnetic course or bearing of an object, is liable to be destroyed or injured by the alcoholic mixture within which the cards are floated or submerged.

To prevent this destructive or injurious action of the liquid, I not only combine or mix, with the pigment or pigments to be employed in producing the paint, a quantity of albumen, caseine, or the equivalent thereof, but, with or after the application of the compound or mixture to the surface or surfaces on which it is to be spread, I effect coagulation of the albumen or caseine by the action of lime, heat, or other substance or matter well known as proper for such purpose.

If we suppose the pigment or pigments used to be dry white lead, or the same, and a small quantity of lime, the same should be quickly and thoroughly incorporated with a sufficient quantity of the albumen to bring the mixture to the consistency required for painting it on a surface. Immediately after the accomplishment of this, the mixture should be applied to the surface or compass-card intended to receive it, or the pigment and albumen may be mixed and put on the surface, and coagulation effected, by an after application of solution of lime, or by the action of heat or other agent capable of producing coagulation. Next, the part so painted, and the paint on it, may, if desirable, be exposed to a temperature such as will insure coagulation of the albumen, with or without the aid of lime or its equivalent. One or more coats of the paint may be applied to the surface or article, coagulation of the albumen of each being effected in like manner.

Experience has demonstrated that a paint so made, and applied to a surface exposed to alcohol, will retain its color, and remain uninjured, for almost any length of time.

Albumen, caseine, and various like substances, are not soluble in or destructible by alcohol, nor will they decompose while submerged therein. Thus, it will be seen that, with the albumen used as a vehicle for the pigment or pigments, the paint, when applied to the compass-card, or the interior surface of the compass-box, will not be washed therefrom, or have its color changed, by the liquid contained in the box.

What I claim as my invention, is—

The application to a compass-card, or other article to be exposed to alcohol or an alcoholic mixture, as set forth, a paint composed of one or more pigments and a coagulating-material, (such as albumen, for instance,) and then, or subsequently, effecting coagulation of the vehicle, the whole being substantially as and for the purpose above specified.

E. S. RITCHIE.

Witnesses:
F. P. HALE, Jr.,
J. R. SNOW.